(12) United States Patent
Sleator (10) Patent No.: US 9,230,762 B2
(45) Date of Patent: Jan. 5, 2016

(54) SYSTEM FOR AUTOMATIC DECOMMISSIONING OF NETWORK PARTICIPANTS WHEREIN DEVICE HAS A DEFLECTIVE MEMBER HAVING VARIOUS STATES AND VARIOUS LENGTHS

(71) Applicant: Google Inc., Mountain View, CA (US)

(72) Inventor: Michael Sleator, Woodside, CA (US)

(73) Assignee: Google Inc., Mountain View, CA (US)

( * ) Notice: Subject to any disclaimer, the term of this patent is extended or adjusted under 35 U.S.C. 154(b) by 76 days.

(21) Appl. No.: 14/197,566

(22) Filed: Mar. 5, 2014

(65) Prior Publication Data

US 2014/0184365 A1    Jul. 3, 2014

Related U.S. Application Data

(62) Division of application No. 13/551,688, filed on Jul. 18, 2012, now Pat. No. 8,706,934.

(51) Int. Cl.
| | |
|---|---|
| *G06F 13/00* | (2006.01) |
| *G06F 3/00* | (2006.01) |
| *H01H 36/00* | (2006.01) |
| *G06F 13/40* | (2006.01) |
| *H01H 37/00* | (2006.01) |

(52) U.S. Cl.
CPC ............ *H01H 36/00* (2013.01); *G06F 13/409* (2013.01); *H01H 37/00* (2013.01); *Y10T 29/49004* (2015.01)

(58) Field of Classification Search
CPC .................................................. G06F 13/409
USPC .......................................... 710/15–19, 62, 64
See application file for complete search history.

(56) References Cited

U.S. PATENT DOCUMENTS

| | | | |
|---|---|---|---|
| 4,498,126 A | 2/1985 | Hernandez | |
| 6,528,954 B1 | 3/2003 | Lys et al. | |
| 7,455,435 B2 | 11/2008 | Matthews et al. | |
| 7,692,559 B2 | 4/2010 | Face et al. | |
| 7,865,639 B2 | 1/2011 | McCoy et al. | |
| 7,867,017 B1 | 1/2011 | Chen | |
| 7,918,121 B2 | 4/2011 | Schell et al. | |
| 8,706,934 B2* | 4/2014 | Sleator ........................... | 710/62 |
| 9,054,440 B2* | 6/2015 | Taylor et al. ......................... | 1/1 |
| 2003/0023410 A1 | 1/2003 | Roth | |

FOREIGN PATENT DOCUMENTS

| | | |
|---|---|---|
| EP | 0 639 938 | 2/1995 |
| EP | 1 349 437 | 10/2003 |
| EP | 1 480 495 | 11/2004 |
| EP | 1 624 729 | 2/2006 |
| WO | 2010097737 | 9/2010 |

OTHER PUBLICATIONS

European Patent Office, Extended European Search Report for EP 13175778.8, dated Dec. 16, 2013.

* cited by examiner

*Primary Examiner* — Tammara Peyton
(74) *Attorney, Agent, or Firm* — Morris & Kamlay LLP (57) ABSTRACT

Disclosed is a memory device in which the state of the memory may be set by a mechanical action, with or without mains power present. The memory state may be detected by a microcontroller. The state for the memory device may be reset by a microcontroller. The microcontroller may be external to an apparatus containing the memory device, adjacent to or within the apparatus.

15 Claims, 5 Drawing Sheets

SYSTEM FOR AUTOMATIC DECOMMISSIONING OF NETWORK PARTICIPANTS WHEREIN DEVICE HAS A DEFLECTIVE MEMBER HAVING VARIOUS STATES AND VARIOUS LENGTHS

CROSS-REFERENCE TO RELATED APPLICATIONS

This application is a divisional application of U.S. application Ser. No. 13/551,688, filed Jul. 18, 2012, the disclosure of which is incorporated by reference in its entirety.

BACKGROUND

Non-volatile memory systems that maintain the state of a memory are known. However, electrical power is typically required to change the state of the memory. Devices having identifying or other data, such as operational parameters, stored in memory may be connected to a network. A computer connected to the network may read the device data from the memory, and perform an operation, such as registering the device in the network, using the identifying or other data. The computer may store send data to the device memory. The stored data may include proprietary data or particular operational parameters that may affect the performance of the connected device. The device memory requires power to be applied whenever data is to be read or whenever data is being written to the memory. As a result, power must constantly be applied to the device. If the device has non-volatile memory, when the device is disconnected from the network it may have proprietary data stored in the device. If the device is connected to another network, the network may access the proprietary data, or alternatively, be unable to recognize the device due to the changed operating parameters or other changed data stored in the device memory.

BRIEF SUMMARY

According to an embodiment of the disclosed subject matter, a method may include a device having a mechanism in a first state prior to installation of the device within an appliance that in response to an installation of a device within an appliance, the state of the mechanism may change from the first state to a second state. The second state of the mechanism may be detected. Based on the detection of the second state of the device, the device may be commissioned into a computer network. The network may recognize the device upon commissioning the device into the network. The state of the mechanism may be changed from the second state to a third state. Upon removal of the device from the appliance, the state of the mechanism may revert back to the first state.

According to an embodiment of the disclosed subject matter, another method may include a memory mechanism in a first state that in response to pressure applied to a compression mechanism of the device may change a state of the mechanism from the first state to a second state. The second state of the mechanism may be detected. Based on the detection of the second state of the device, the device may be commissioned into the computer network. The state of the mechanism may be changed from the second state to a third state. Upon removal of the device from the appliance, the mechanism state may revert back to the first state.

According to an embodiment of the disclosed subject matter, a device may include an insertion sense device, a deflective member, and a contact member. The insertion sense device may be responsive to insertion of the insertion sense pin into an appliance. The deflective member may have a first length when the deflective member is in an initial state and having a second length in a deflected state. The first length may be greater than the second. The contact member may include contacts for closing a circuit.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

In the context of home automation systems, it would be advantageous to provide a memory device that does not require power to maintain a memory state, and reverts to an initial state when the device is disconnected from a network. For example, an "intelligent" device that has a microprocessor and a transceiver may be installed in an appliance. A specific example may be an intelligent light bulb that is installed in a light fixture. The intelligent light bulb may respond to wireless control signals from a network controller, and as a result may perform a number of advanced functions. For example, light switches connected to the home automation network that control lights on a first circuit may also control intelligent light bulbs connected to other circuits. Or, if it is after 9 PM in the evening, turning on a television also containing a memory mechanism may cause intelligent light bulbs in the room to dim. The memory mechanism may maintain a memory state indicating the device has been commissioned in a network.

Figure 1:
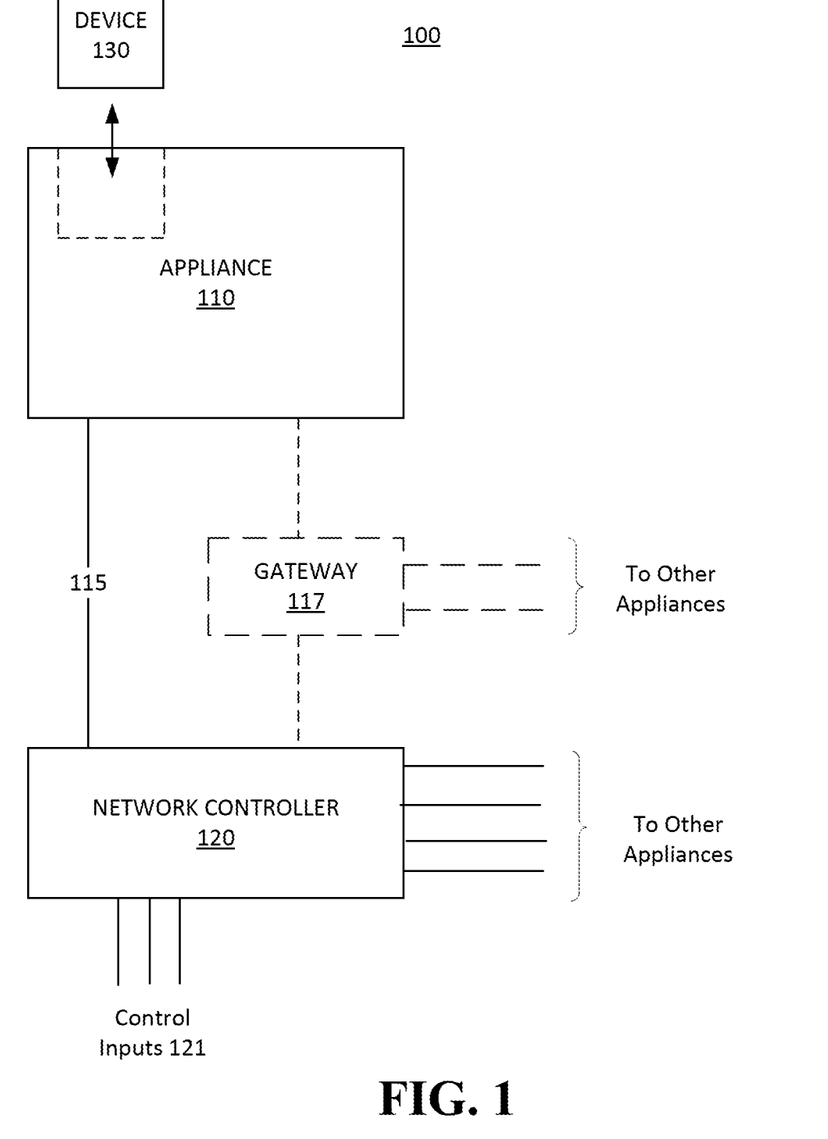
FIG. 1 shows a system according to an embodiment of the disclosed subject matter.

FIG. 1 shows a block diagram of an example home monitoring system 100. The system 100 may include an appliance 110, a network controller 120 and a memory device 130. The appliance 110 may be any type of appliance, and may be considered as an appliance within any category of appliances, such as a kitchen product category, a bathroom product category, a patio, such as a gas fire pit, an entertainment product category, such as a computer game, an audio visual product category, such as a television, a recreational area product category, a bedroom product category, a garage product category, a child product category, a pet product category, and a patio product. For example, the appliance may be a light fixture, a television, a garage door opener, a dishwasher, a clothes washer, clothes dryer or the like. The appliance 110 may connect to a microcontroller within the network controller 120 via a communication path 115. Although shown as a direct, wired connection, the communication path 115 between the network controller 120 may be a wireless connection, a communication path through other appliances, or through other network devices, such as an optional, home monitoring gateway device 117 or the like. As used herein, an "appliance" may be referred to as a "product," and the terms may be used interchangeably.

The memory device 130 may be installed into the appliance 110. Installation of the device into the appliance may be through a docking location, a slot-like opening, a compartment, a bracket or the like.

The network controller 120 may coordinate via a user interface operation and control of the appliance 110, such as through control inputs 121. The network controller 120 may coordinate operation of multiple appliances by sending control signals, and may also connect to external networks, such Wi-Fi, a LAN or WAN. A microcontroller within home monitoring gateway device 117 may facilitate commissioning of the appliance 110 in the network, may monitor the status appliance, and may provide control signals to the appliances. The gateway device 117 may similarly receive and send signals from/to appliances, the network controller 120, and other gateway devices.

Figure 2:
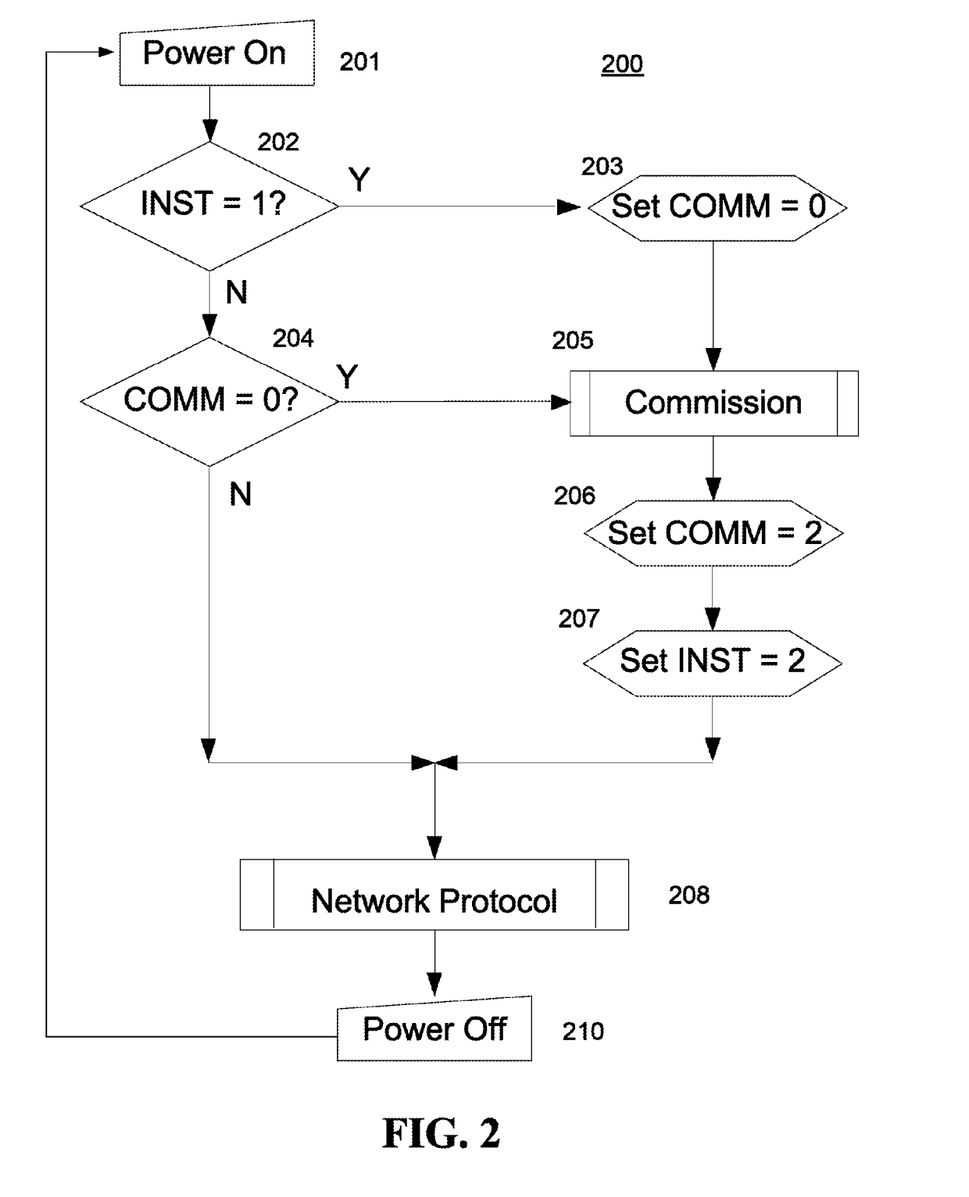
FIG. 2 shows a method for commissioning an apparatus based on a state of the memory device according to an embodiment of the disclosed subject matter.

An example of the operation of the system 100 will be described with reference to FIG. 2. FIG. 2 shows a method of commissioning the memory device 130 in the network controller 120. The process 200 may determine the different states of a pair of variables, INST and COMM in the example, for the respective appliance 110. Both the INST and COMM variables may be set and read by a microcontroller, such as the network controller 120 or gateway 117. The INST and COMM variable values may be set and read by the microcontroller and may be stored in a non-volatile electrical memory associated with the microcontroller. The INST variable may be changed both by the mechanical action of installing the memory device 130 into, or removing the device from, the appliance and by the microcontroller.

The INST variable corresponds to the state of the memory device 130, and may have one of three state values. For example, when the memory device 130 is not installed in an appliance, the INST variable value for the respective appliance may be set to a state value of "0" (zero) (See FIG. 4, "State 0"). Upon installation into an appliance, the memory device 130 state may change and the INST variable value may change to a "1" (one) (See FIG. 4, "State 1"). After the appliance is commissioned in the network, the INST variable value may be changed to a "2" (two) to correspond to a change in the state of the memory device 130 (See FIG. 4, "State 2"). Each of the states of the INST variable may represent information about the current physical state of the network device with respect to an appliance into which it may be installed or removed. The COMM variable may have one of two values, and may represent the logical state of the device with respect to its inclusion in the network protocol. For example, a COMM variable value "0" may indicate that that the appliance has not been commissioned into the network, while a value of "2" may indicate that the appliance has been commissioned into the network. The specific variable names and values described herein are illustrative only, and generally any variable names and specific values for the different states may be used.

As shown in FIG. 2, an example of a commissioning process 200 may begin at power "ON" (201) of the device. In the illustrated example, when the appliance has been commissioned into the network the INST variable value is set to a value 2. Accordingly, a first determination, at step 202, in the process 200 may determine whether the appliance has been commissioned into the network based on the INST variable value. In response to a "YES" determination, the process 200 may branch to step 203. At step 203, the COMM variable value is set to a "0" state and the process 200 may continue to commissioning process 205. Alternatively, at step 202, in response to a "NO" determination, the process 200 may branch to step 204 to determine whether the COMM variable state is equal to a "0" state. In response to a "YES" determination at step 204, the process 200 may continue to commissioning process 205. At commissioning process 205, the microcontroller may obtain data identifying the memory device and appliance related data (such as "ON/OFF" state, failure codes and the like) from the appliance, and may generate necessary connections, data structures and take other actions for instantiating the appliance into the network. Once a device is commissioned into the system, it may be addressed by other entities in the network, and/or may otherwise communicate with other resources in the network. It also may be controlled as part of the network, for example where an intelligent light fixture or bulb is commissioned into a specific location or role, and subsequently may be controlled by a home monitoring or similar network. Upon commissioning the device into the system, the process 200 may continue to step 206 at which the COMM variable may be set to a "2" state. The process 200 may continue to step 207 at which the INST variable value is set to a "2" state.

Figure 4:
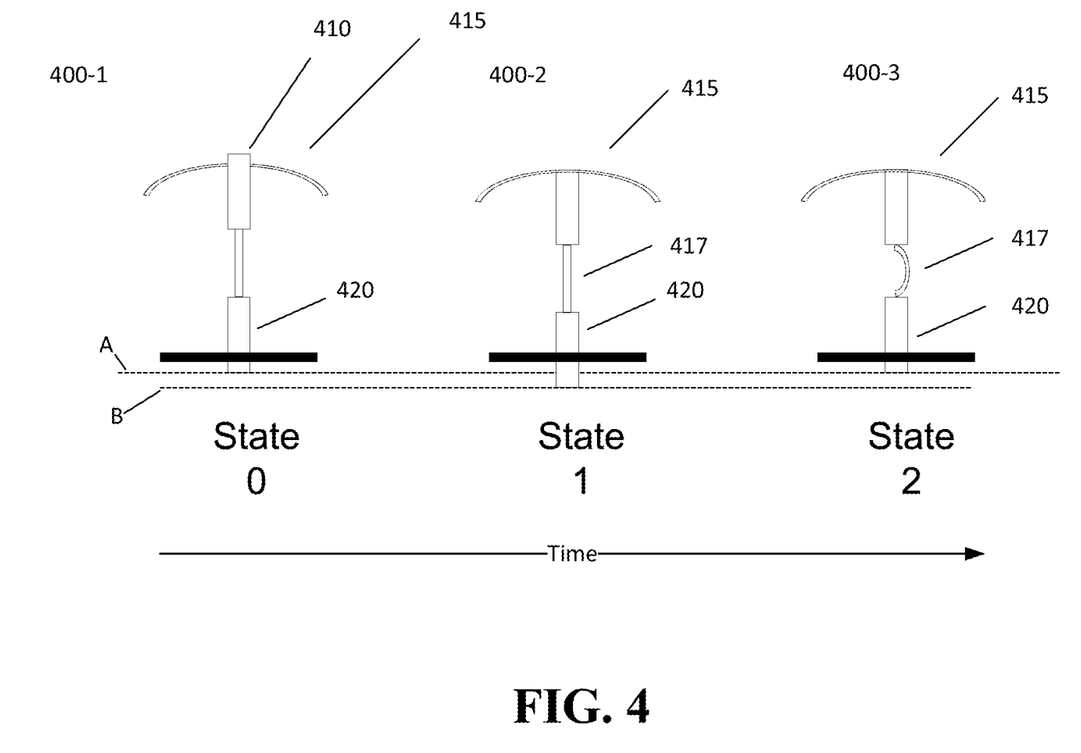
FIG. 4 shows different states of the memory device according to an embodiment of the disclosed subject matter.

The change in value of the INST variable is the result of a change in state of the memory device as shown in FIG. 4, "State 2." The process 200 may begin performing the network protocol 208 after step 207. An example of the network protocol may be, for example, periodic status checks of the appliance operating parameters (power usage, duration of ON status) and operation of the appliance. The process 200 may complete at step 209 when the device is powered off.

Returning to step 204 in the process 200, in response to a "NO" determination that COMM variable value is not equal to "0", the microcontroller may determine that the appliance is commissioned in the network. As a result, the process 200 may continue to network protocol process 208. At which, the process 200 may begin performing the network protocol 208 after step 207. An example of the network protocol may be, for example, periodic status checks of the appliance operating parameters (power usage, duration of ON status) and operation of the appliance. The process 200 may complete at step 209 when the device is powered off.

Advantageously, the process 200 allows a device to be commissioned into a network, and maintain the commissioned status without the device being continuously supplied with power. For example, an intelligent light bulb containing the device may have an initial state when in a package, when installed in a fixture the device state may change to a second state simply by installation in the fixture. Upon commissioning of the device, the state of the device may change to a third state, which is maintained even though power may be removed from the intelligent light bulb. If the intelligent light bulb is removed from the fixture, the device reverts back to the first state without having to apply power to, or decommissioning the light bulb.

Figure 3:
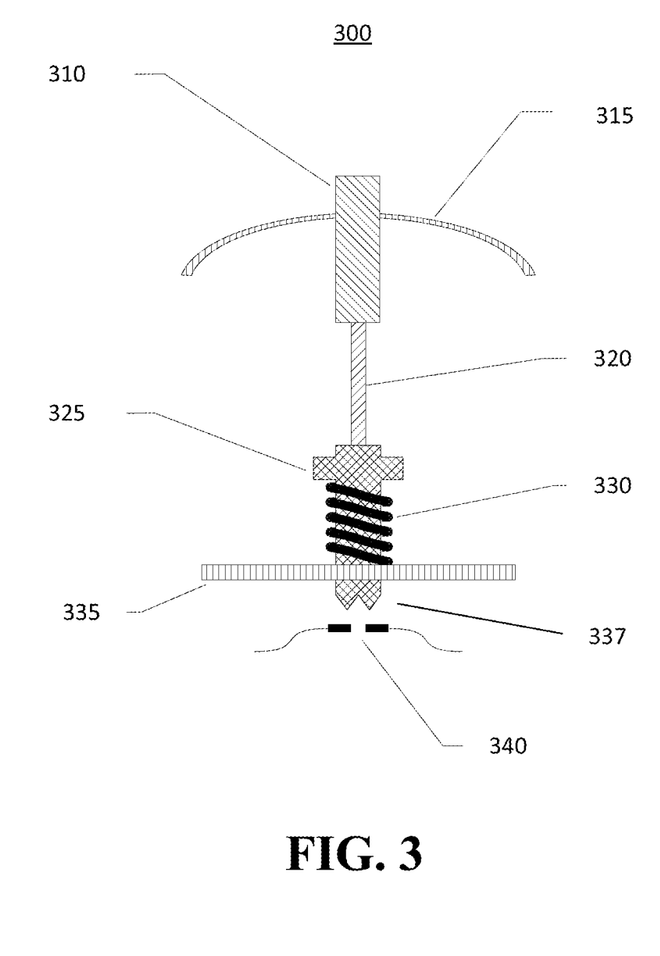
FIG. 3 shows a memory device according to an embodiment of the disclosed subject matter.

In a specific embodiment as illustrated in FIG. 3, a memory device 300 may include an insertion sense pin 310, an installation element 315, a deformable element 320, a switch plunger 325, a return spring 330, a base plate 335, switch contacts 337 and terminal contacts 340. An example of how a device such as the device 300 may operate as physical memory is provided in further detail below with reference to FIG. 4.

The insertion sense pin 310 may respond to pressure applied to it. For example, the installation of the memory device 300 into an appliance, such as light bulb socket, refrigerator, coffee maker, and the like, may cause the insertion sense pin 310 to be pushed into, or nearly flush with, the surface of the installation element 315. The insertion sense pin 310 may be made from Teflon, nylon or some other rigid, but inexpensive material. The installation element 315 may be an exterior surface of the memory device 300. Although shown as having a concaved, curved configuration, the installation element may be flat or convex. Alternatively, the insertion sense pin 310 may be completely enclosed within the memory device 300, and may be actuated by magnetic or electric fields, or a thermal stimulus. The pressure applied to the insertion sense pin 310 may be similarly applied to deformable element 320, switch plunger 335, and compression spring 330. The memory device 300 may be installed in any type of appliance or in a product that may be installed in a receptacle, such as an outlet, light socket, refrigerator or the like. The memory device 300 may be incorporated into a number of different devices that may benefit from being commissioned into a network. For example, the memory device 300 may be incorporated into a light bulb, a door to an enclosure, such as an appliance door, an electrical plug, and the like.

FIG. 4 shows different states of an example memory device according to an embodiment of the disclosed subject matter. The memory device may be installed in a number of different products, which may be commissioned in a home monitoring network. In state 0, the memory device 400-1 is shown in a removed state 0 as it may appear prior to installation in a network-monitored appliance and as in a package prior to being purchased or used. The memory device 400-1 may be in state 0 prior to being installed in a network-monitored device such as a light bulb socket, a refrigerator, microwave, or the like. The lines A and B illustrate the different contact states of the memory device in respective states. At line A, the contacts of the memory device do not contact any contact pads (i.e., the contacts are open), and at line B, the contacts of the memory device may contact electrical contact pads in a circuit (i.e., the contacts are closed) for commissioning the appliance in the network.

In more detail, state 0 may show an insertion sense pin 410 extending beyond an installation element 415. In the first state (State 0), the switch plunger 420 may extend only to the line A. In response to the installation of the memory device 400-2 into a network-monitored device, such as a receptacle, the memory device may transition to a second state (state 1) from the initial or first state (state 0). Upon insertion of the device 400-2 in a receptacle, such as a light fixture or a slot in a television, a spring-like element incorporated with the switch plunger 420 may be compressed by movement of the insertion sense pin 410. In the second state (state 1), the insertion sense pin 410 may extend below the installation element 415 causing the switch plunger 420 to extend to line B, at which point contacts are closed. The closed contacts may allow associated circuitry to identify the product to the monitoring network. For example, the microcontroller may detect the second state (state 1) by querying the product or by receiving a signal from a transceiver in the product in which the memory device is installed. A network controller may use information related to the identified product retrieved either from the device, or a database, to commission the product into the monitoring network. After commissioning of the product in the monitoring network, the network controller may output a commissioning signal to the product. An actuating device within the product may respond to the commissioning signal by manipulating the deformable member 417. For example, the deformable member 417 may be a flexible metal that is forcibly flexed by a plunger that strikes the deformable member causing it to flex. The deformable member 417 may remain flexed due to the spring force of the spring-like element incorporated in the switch plunger 420. As a result of manipulation of the deformable member 417, the memory device may attain a third state, state 2. Of course, other methods of manipulating the deformable member 417 may also be used. For example, the deformable member 417 may be bimetallic and may react to a thermal stimulus, or it may be magnetic and may respond to a magnetic field. When the product is queried after commissioning, state 2 of the memory device 400-3 indicates to a microcontroller that the product has been commissioned into the network. The microcontroller may also set other variables, for example, populate a data structure with product including product identifying data, such as appliance model number, in response to the memory device attaining state 2. Although described as "open" contacts indicating either a non-commissioned or commissioned state, and "closed" contacts indicating an appliance ready for commissioning, the opposite contact convention may also be used, or multiple pairs of contacts may be actuated upon installation and removal of the memory device.

Figure 5:
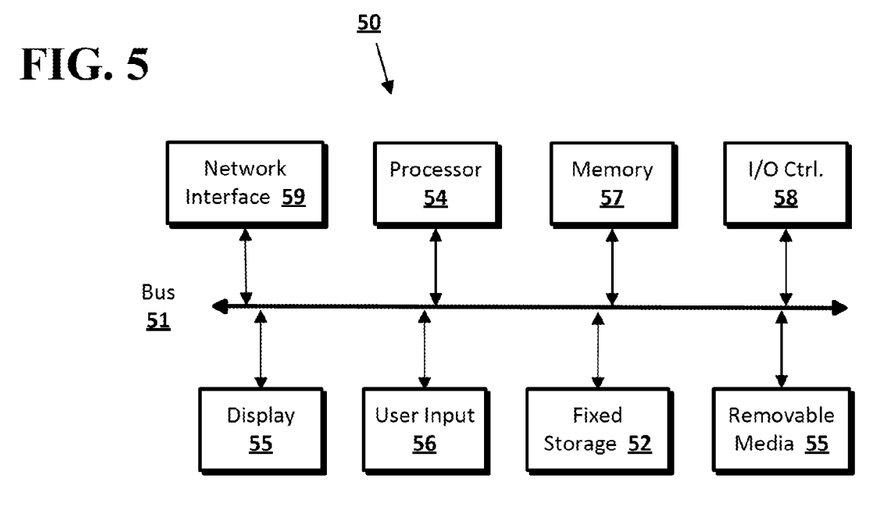
FIG. 5 shows a computer responsive to an exemplary memory according to an embodiment of the disclosed subject matter.

Embodiments of the presently disclosed subject matter may be implemented in and used with a variety of component and network architectures. FIG. 5 is an example computer 20 suitable for implementing embodiments of the presently disclosed subject matter. The computer 20 may be at least one of network controller, a gateway device, or within an appliance. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
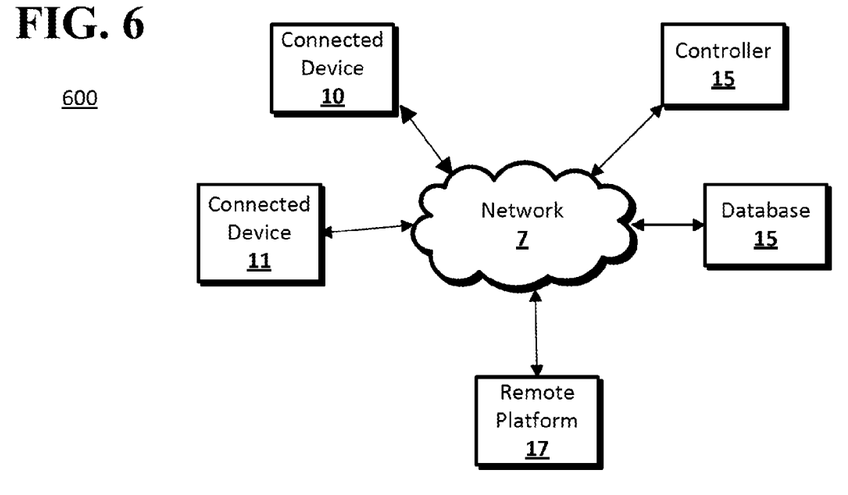
FIG. 6 shows a network configuration implemented according to an embodiment of the disclosed subject matter.

FIG. 6 shows an example network arrangement according to an embodiment of the disclosed subject matter. One or more clients 10, 11, such as local computers, smart phones, tablet computing devices, network controller, gateway, an appliance, and the like may connect to other devices via one or more networks 7. The network may be a local network, wide-area network, the Internet, or any other suitable communication network or networks, and may be implemented on any suitable platform including wired and/or wireless networks. The clients may communicate with one another, or with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Alternatively, the remote platform 17 may be a portable device, such as a smartphone, tablet computing device, a laptop or the like.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A device, comprising:
   an insertion sense device responsive to insertion of the device into an appliance;
   a deflective member having a first length when the deflective member is in an initial state and having a second length in a deflected state, wherein the first length is greater than the second;
   a contact member including contacts for closing a circuit; and
   a spring encircling the contact member that provides a pressure to maintain the deflective member in the deflected state.

2. The device of claim 1, further comprising:
   a base plate that contacts the spring and through which passes the contact member to make contact with contact pads of the circuit.

3. The device of claim 1, wherein the insertion sense device is at least one of a pin, a magnetic device, and a thermal resistive element.

4. The device of claim 1, wherein the insertion sense device is a non-conductive pin.

5. A device, comprising:
   an insertion sense device responsive to insertion of the device into an appliance, the insertion sense device comprising at least one selected from the group consisting of: a pin, a magnetic device, and a thermal resistive element;
   a deflective member having a first length when the deflective member is in an initial state and having a second length in a deflected state, wherein the first length is greater than the second;
   a contact member including contacts for closing a circuit.

6. The device of claim 5, further comprising a spring encircling the contact member.

7. The device of claim 6, wherein the spring provides a pressure to maintain the deflective member in the deflected state.

8. The device of claim 6, further comprising:
a base plate that contacts the spring and through which passes the contact member to make contact with contact pads of the circuit.

9. The device of claim 5, wherein the insertion sense device is non-conductive pin.

10. A device, comprising:
an insertion sense device comprising a non-conductive pin, the insertion sense device responsive to insertion of the device into an appliance;
a deflective member having a first length when the deflective member is in an initial state and having a second length in a deflected state, wherein the first length is greater than the second; and
a contact member including contacts for closing a circuit.

11. The device of claim 10, further comprising a spring encircling the contact member.

12. The device of claim 11, wherein the spring provides a pressure to maintain the deflective member in the deflected state.

13. The device of claim 11, further comprising:
a base plate that contacts the spring and through which passes the contact member to make contact with contact pads of the circuit.

14. The device of claim 10, wherein the insertion sense device is at least one of a pin, a magnetic device, and a thermal resistive element.

15. The device of claim 10, wherein the insertion sense device is non-conductive pin.

* * * * *